(12) United States Patent
Movassaghi et al.

(10) Patent No.: US 7,779,404 B2
(45) Date of Patent: Aug. 17, 2010

(54) MANAGING NETWORK DEVICE CONFIGURATION USING VERSIONING AND PARTITIONING

(75) Inventors: Yassin Movassaghi, Raleigh, NC (US);
Sukumar Puvvala, Bangalore (IN); C. Michael Letchworth, Cary, NC (US);
Kapil Jain, San Jose, CA (US); Neal McDonnell, Worcester (GB); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1023 days.

(21) Appl. No.: 11/043,281

(22) Filed: Jan. 25, 2005

(65) Prior Publication Data

US 2006/0007944 A1      Jan. 12, 2006

Related U.S. Application Data

(60) Provisional application No. 60/579,072, filed on Jun. 10, 2004.

(51) Int. Cl.
G06F 9/44      (2006.01)
G06F 9/445     (2006.01)

(52) U.S. Cl. .................. 717/171; 717/168; 717/170; 717/174

(58) Field of Classification Search .............. None
See application file for complete search history.

(56) References Cited

U.S. PATENT DOCUMENTS

| | | | |
|---|---|---|---|
| 4,965,719 A | 10/1990 | Shoens et al. | |
| 5,339,435 A | 8/1994 | Lubkin et al. | |
| 5,394,531 A | 2/1995 | Smith | |
| 5,418,966 A | 5/1995 | Madduri | |
| 5,752,245 A | 5/1998 | Parrish et al. | |
| 5,832,503 A | 11/1998 | Malik et al. | |
| 6,041,350 A | 3/2000 | Takimoto | |
| 6,154,878 A * | 11/2000 | Saboff | 717/173 |
| 6,167,445 A | 12/2000 | Gai et al. | |

(Continued)

OTHER PUBLICATIONS

Boardman, Bruce, "Cirrus Configuration Management 2, Cheap and Easy Network Device Configuration Management," Toshiba, Network and Systems Management—Sneak Preview, Dec. 14, 2005, 3 pages.

(Continued)

*Primary Examiner*—Lewis A Bullock, Jr.
*Assistant Examiner*—Mark A Gooray
(74) *Attorney, Agent, or Firm*—Hickman Palermo Truong & Becker LLP

(57) ABSTRACT

Configuration versioning and partitioning are provided as methods for managing large configuration for a network element such as a router or switch. In one aspect, a method performed in a network element, the network element comprising a plurality of software components that control operations and features of the network element, wherein operations and features of the network element are defined in part by a configuration, comprises creating and storing one or more configuration partition namespaces each comprising a version identifier and one or more configuration tuples; associating one or more of the configuration partition namespaces in a configuration partition; associating one of the software components and the one or more configuration partition namespaces; and creating and storing information identifying one of the software components, its associated configuration partition namespaces, and the version identifier of each of the configuration partition namespaces.

25 Claims, 9 Drawing Sheets

U.S. PATENT DOCUMENTS

| | | | |
|---|---|---|---|
| 6,490,564 B1 | 12/2002 | Dodrill et al. | |
| 6,493,804 B1 | 12/2002 | Soltis et al. | |
| 6,539,425 B1 | 3/2003 | Stevens et al. | |
| 6,584,508 B1 | 6/2003 | Epstein et al. | |
| 6,681,382 B1 | 1/2004 | Kakumani et al. | |
| 6,826,597 B1 | 11/2004 | Lonnroth et al. | |
| 6,895,414 B2 | 5/2005 | Ford et al. | |
| 6,952,703 B1* | 10/2005 | Kathail et al. | 707/102 |
| 7,054,901 B2 | 5/2006 | Shafer | |
| 7,096,256 B1 | 8/2006 | Shafer | |
| 7,103,616 B1 | 9/2006 | Harmer et al. | |
| 7,111,206 B1 | 9/2006 | Shafer et al. | |
| 7,114,008 B2 | 9/2006 | Jungck et al. | |
| 7,146,414 B1* | 12/2006 | Sievert et al. | 709/223 |
| 7,233,975 B1 | 6/2007 | Gerraty et al. | |
| 7,305,658 B1* | 12/2007 | Hamilton et al. | 717/120 |
| 7,363,351 B1 | 4/2008 | Shafer | |
| 7,506,337 B2* | 3/2009 | Iyer | 717/177 |
| 7,523,097 B1 | 4/2009 | Wilson et al. | |
| 7,558,835 B1 | 7/2009 | Shafer | |
| 2002/0174207 A1* | 11/2002 | Battou | 709/223 |
| 2003/0051008 A1 | 3/2003 | Gorthy et al. | |
| 2003/0101240 A1 | 5/2003 | Courtney | |
| 2003/0105761 A1 | 6/2003 | Lagerman | |
| 2003/0120678 A1* | 6/2003 | Hill et al. | 707/102 |
| 2004/0059813 A1 | 3/2004 | Bolder et al. | |
| 2004/0139179 A1 | 7/2004 | Beyda | |
| 2005/0033805 A1 | 2/2005 | Fujiyama et al. | |
| 2005/0132064 A1 | 6/2005 | Lo | |
| 2005/0204186 A1* | 9/2005 | Rothman et al. | 714/7 |
| 2005/0246687 A1* | 11/2005 | Scott | 717/122 |
| 2006/0031183 A1 | 2/2006 | Oral et al. | |
| 2006/0031427 A1 | 2/2006 | Jain et al. | |
| 2006/0080424 A1 | 4/2006 | Sun et al. | |

OTHER PUBLICATIONS

Cisco, "Configuration Management: Best Practices White Paper," Document ID 15111, Jan. 10, 2006, 8 pages.

The Patent Office of the People's Republic of China, "The Second Office Action," Apr. 14, 2010, Application No. 200580019076.8, 3 pages.

"Currently Pending Claims After the First Office Action," Application No. 200580019076.8, 20 pages.

* cited by examiner

MANAGING NETWORK DEVICE CONFIGURATION USING VERSIONING AND PARTITIONING

PRIORITY CLAIM

This application claims domestic priority under 35 U.S.C. §119(e) from prior provisional application Ser. No. 60/579,072, filed Jun. 10, 2004, the entire disclosure of which is hereby incorporated by reference as if fully set forth herein.

CROSS-REFERENCE TO RELATED APPLICATIONS

This application is related to co-pending application Ser. No. 10/866,338, filed Jun. 10, 2004, invented by Mark Freskos et al., entitled "Transport-independent pluggable operation type handler framework for servicing XML management requests," and co-pending application Ser. No. 10/866,067, filed Jun. 10, 2004, invented by Jiong Sun et al, entitled "A generic framework for deploying EMS provisioning services," and co-pending application Ser. No. 10/866,528, filed Jun. 10, 2004, invented by Kapil Jain, et al, entitled "Configuration commit database approach and session locking approach in a two-stage network device configuration process," which is a continuation of co-pending application Ser. No. 10/866,647, and co-pending application Ser. No. 10/866,169, filed Jun. 10, 2004, invented by Mark Freskos et al, entitled "Protocol for efficient exchange of XML documents with a network device," the entire disclosures of which are hereby incorporated by reference as if fully set forth herein.

FIELD OF THE INVENTION

The present invention relates to managing configuration of a network device using versioning and partitioning approaches.

BACKGROUND

Certain aspects of the operation of network elements such as switches, routers, and other devices are controlled using a set of commands and parameter values collectively known as the configuration of the network device. The configuration commands may be expressed in a command-line interface (CLI) language or other formal syntax that is machine-readable and capable of automatic parsing and implementation by software processes. The development of larger routers with many interfaces has led to the use of configuration having hundreds or thousands of lines. Further, development of large routers has been accompanied by the development of modularized operating system and application software for implementing various routing functions and technology features.

In a router having a large-scale, distributed architecture, particular blocks of configuration lines may be associated with particular software modules or components. Installing or removing specific software modules or components may require adding or deleting complementary sections of configuration. The failure to add or delete the correct blocks of configuration that relate to a change in software modules or components may lead to incorrect operation or failure of the router. In particular, every feature configuration may be applied to a network device only if a software package that implements the feature, and all dependent or required packages, are activated on the network device also. In addition, applying a large configuration to a network device at boot up time may result in use of an excessive amount of memory and other resources at boot up. However, in current approaches there is no practical method for managing large-scale network device configuration that addresses all of these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the description of the embodiments herein.

Functional Overview

Embodiments of the invention provide for configuration versioning and partitioning as methods for managing large configuration for a network element such as a router or switch. In one aspect, a method performed in a network element, the network element comprising a plurality of software components that control operations and features of the network element, wherein operations and features of the network element are defined in part by a configuration, comprises creating and storing one or more configuration partition namespaces each comprising a version identifier and one or more configuration tuples; associating one or more of the configuration partition namespaces in a configuration partition; associating one of the software components and the one or more configuration partition namespaces; and creating and storing information identifying one of the software components, its associated configuration partition namespaces, and the version identifier of each of the configuration partition namespaces.

According to one feature, the version identifier comprises a major version number and minor versions number, which are selectively incremented as changes occur depending on the nature of a change in configuration tuples of a namespace. In another feature, management processes provide for installing or deleting configuration, as part of configuration namespaces, in coordination with online insertion or removal of software components from an actively running network device. In yet another feature, configuration commits result in storing metadata including version numbers as part of rollback points that describe the commits. Namespace change sets describe changes in configuration namespaces arising from commits. Later requests for rollback to an earlier version number include determining software component compatibility based on the version numbers. Old rollback points and namespace change sets may be periodically deleted to reclaim storage.

Other embodiments are described in further detail herein.

Architecture Overview

Figure 1:
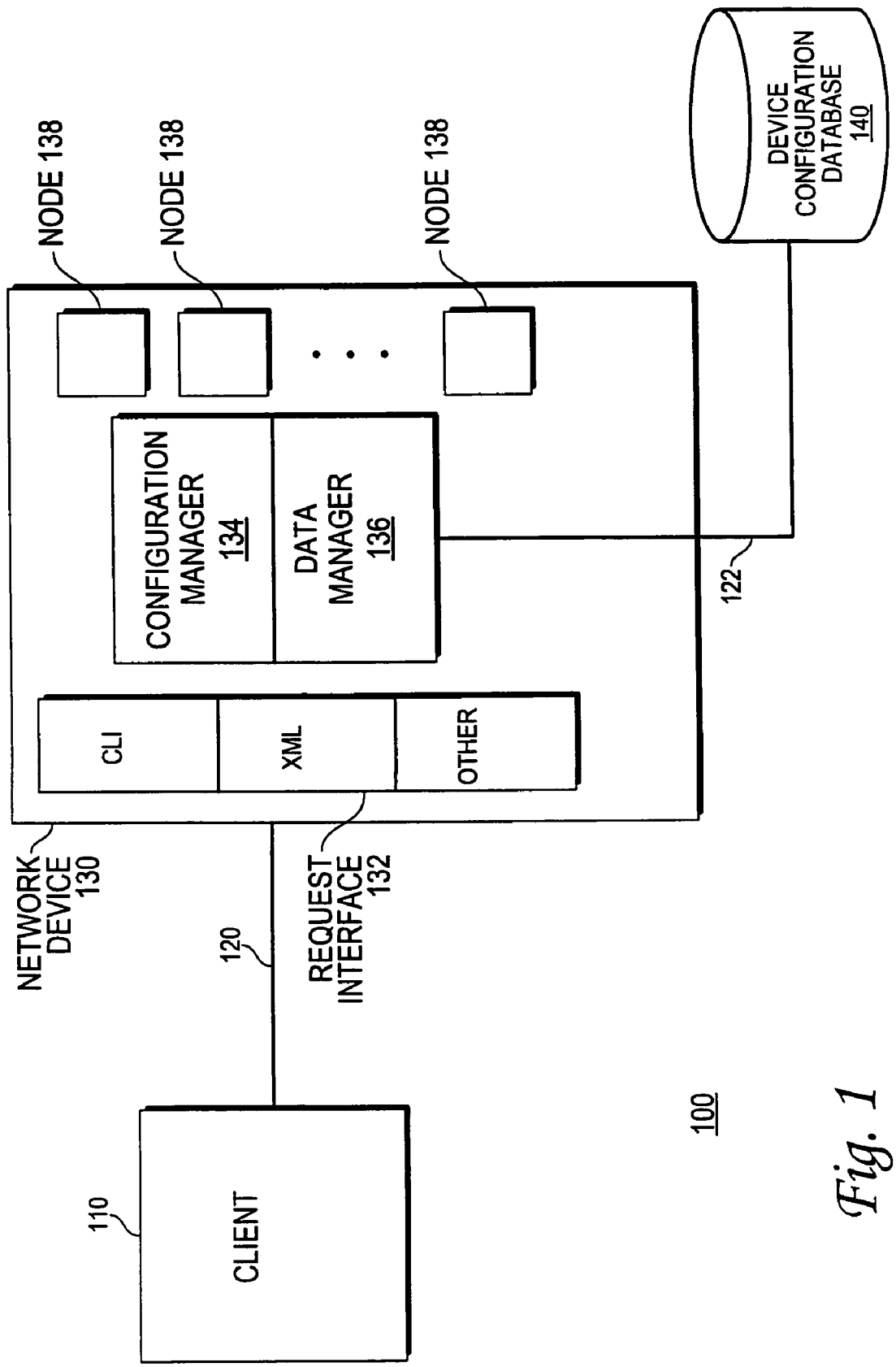
FIG. 1 is a block diagram of a system according to an embodiment.

FIG. 1 is a block diagram of a system 100 according to an embodiment. The system 100 of FIG. 1 may be used to modify the configuration of a network device using a two-stage configuration model. System 100 includes a client 110, communications links 120 and 122, a network device 130, and a device configuration database 140.

A client, such as client 110, may be implemented by any medium or mechanism that provides for the transmission of a command or request to a network device. Client 110 may be implemented in software or in hardware. Examples of client 110 include, without limitation, a web browser, a software application executing on a machine, a wireless device, and a management console. While only client 110 is shown in FIG. 1, embodiments may include any number of clients in system 100.

Communications link 120 may be implemented by any medium or mechanism that provides for the exchange of data between client 110 and network device 130. Communications link 122 may be implemented by any medium or mechanism that provides for the exchange of data between network device 130 and device configuration database 140. Examples of communications links 120 and 122 include, without limitation, a network such as a Local Area Network (LAN), Wide Area Network (WAN), Ethernet or the Internet, or one or more terrestrial, satellite or wireless links.

A network device, such as network device 130, may be implemented by device that is accessible to a network and is capable of being configured. Examples of network device 130 include, without limitation, a router, a server, a PC, a wireless device, a firewall, and a cell phone. While only network device 130 is shown in FIG. 1, embodiments may include any number of network devices in system 100.

Network device 130 includes a request interface 132, a configuration manager 134, a data manager, and one or more nodes 138. A request interface, such as request interface 132, may be implemented by any software component executing on network device 130 that is capable of exchanging communications with client 110. Request interface 132 may exchange communications using a variety of transport protocols. Request interface 132 may also process communications encoded using a variety of protocols, including, but not limited to, CLI and XML.

A configuration manager, such as configuration manager 134, may be implemented by any software component executing on network device 130 that is capable of managing the configuration of the network device. For example, configuration manager 134 may process any request received by request interface 132 that concerns the configuration of the network device.

A data manager, such as a data manager 136, may be implemented by any software component executing on network device 130 that is capable of managing the persistent storage of data to a device configuration database.

A node, such as node 138A, 138B, and 138C, may be implemented by any hardware or software component of network device 130 that may be separately configurable. Examples of node 138A, 138B, and 138C include, without limitation, a line card and a software module that is configurable.

A device configuration database, such as device configuration database 140, as broadly used herein, refers to any medium or mechanism that provides for the persistent storage of data. Examples of device configuration database 140 include, without limitation, a relational database, an object-oriented database, a multidimensional database, a hierarchical database, a file server, and an EPROM chip.

Operation of Two-Stage Configuration Model

Figure 2:
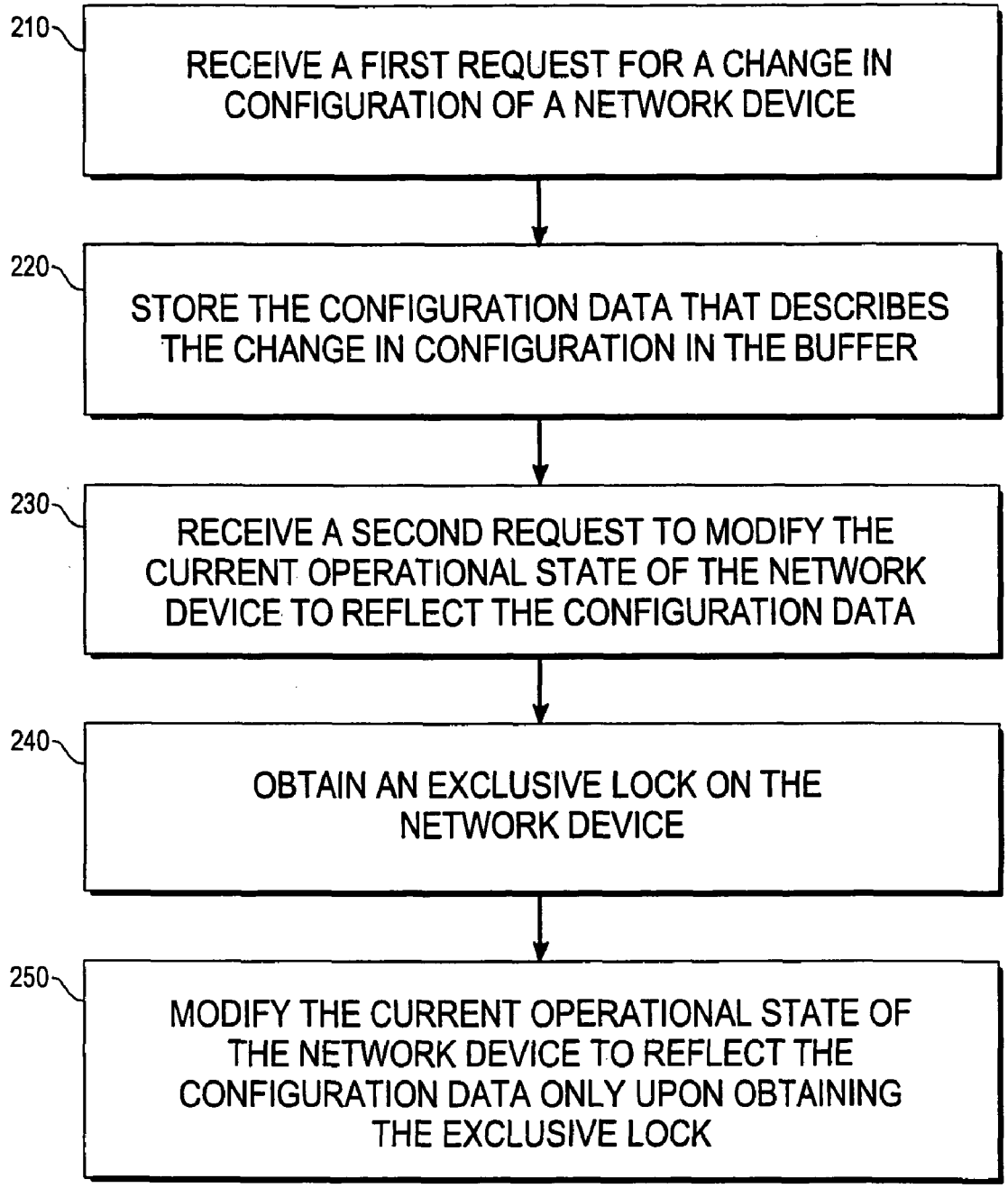
FIG. 2 is a flow chart illustrating the high level functional steps according to an embodiment.

FIG. 2 is a flow chart illustrating the functional steps according to an embodiment. Through the performance of the functional steps of FIG. 2, network device 130 may be configured using a two-stage configuration model. The functional steps of FIG. 2 shall be described below with reference to the illustrative system 100 depicted in FIG. 1.

In step 210, a first request from client 110 to network device 130 over communications link 120 is received. In an embodiment, request interface 132 receives the first request of step 210.

Request interface 132 may receive requests containing one or more commands from client 110 using a variety of transport protocols. Request interface 132 may process requests encoded using a variety of protocols. Request interface 132 may comprises one or more components that parse communications encoded using different protocols, such as CLI and XML. For example, request interface 132 may comprise a component that parses CLI commands, as shown in FIG. 1. Thus, when client 110 transmits a CLI command to request interface 132, request interface 132 is able to process the CLI command.

In another example, request interface 132 may comprise a component that parses XML communications. Request interface 132 may contain a component, as shown in FIG. 1, that can read XML documents and process XML tags and associated information that are contained therein. The processing of requests sent from client 110 to network device 130 that are contained within an XML document shall be explained in greater detail below. Request interface 132 may also expose an API that allows client 110 to issue requests to network device 130.

In an embodiment, the first request of step 210 may contain one or more commands, e.g., the communication may be an XML document that contains one or more commands. One or more the functions listed in Table 1 may be performed by the request received in step 210. Note that Table 1 is merely illustrative, as the request received in step 210 may perform other functions than those listed in Table 1.

TABLE 1

Modify the current operational configuration according to a set of configuration data
Lock the current operational configuration
Unlock the current operational configuration
Retrieve the change made to the configuration data stored in the buffer
Retrieve the current operational configuration
Retrieve a merged configuration reflecting both the configuration data in the buffer and the current operational configuration
Retrieve the configuration changes resulting from a commit operation
Retrieve the configuration changes resulting from a rollback operation
Load the buffer with configuration data stored in a device configuration database
Load the buffer with the failed configuration from the most recent commit operation
Save the contents of a buffer containing configuration data to a device configuration database
Commit the contents of the buffer to cause the current operational state to reflect the configuration data stored in the buffer
Clear the contents of the buffer
Rollback a set of configuration changes
Retrieve the configuration history regarding a set of commits
Retrieve the configuration history regarding all users that are currently configuring the network device Note that the request received in step 210 may be expressed in a variety of forms, including: CLI commands, commands contained within an XML document, one or more calls through an exposed API of request interface 132, or another protocol which request interface 132 is configured to process.

To illustrate the functional steps of the two-stage configuration model, an example shall be described wherein a request is received in step 210 to change the configuration of a network device to a potential state from a current operational state of the network device. The request may accompany or reference configuration data. Configuration data is data that describes a change in the configuration of a network device. Configuration data may describe one or more specific configuration changes made to an operational state of the network device. The current operational state of the network device is the configuration of the network device as it is current operating.

Note that in this example, processing is currently in the first stage of the two-stage model, because prior to entering the second stage of the two-stage model, one needs to obtain the exclusive lock on the network device. After the performance of step 210, processing proceeds to step 220.

In step 220, the configuration data that describes the change in configuration of the network device as requested in step 210 is stored in a buffer. A buffer is any portion of volatile or non-volatile memory on network device 130 that may store configuration data. Upon receipt of the first request of step 210, request interface 132 may forward to configuration manager 134 any request that concerns the configuration of the network device. In an embodiment, configuration manager 134 stores the configuration data in the buffer in step 220.

After configuration data is stored in the buffer after the performance of step 220, the configuration data may be viewed by a user. A user may transmit a request from client 110 to network device 130 to view the configuration data stored in the buffer. In response to receiving such a request, the configuration manager 134 may create and provide a view to the user of the configuration data stored in the buffer. For example, the configuration manager 134 may retrieve the configuration data stored in the buffer, and transmit the retrieved configuration data to the user.

In an embodiment, the network device 130 may comprise a set of one of more buffers. In such an embodiment, each buffer of the set of one or more buffers may be associated with a single user. Each buffer of the set of one or more buffers may only store configuration data associated with the user to which the buffer is associated. For example, network device 130 may comprise 100 buffers, and each of the 100 buffers only stores configuration data for a single user at a time. When a request is received at the network device, the user associated with the request is assigned to a buffer. Thereafter, configuration data associated with that user is stored in the buffer to which the user is assigned. After a period of time elapses, the user may no longer no assigned to a particular buffer; consequently, the next time the user submits a request to network device 130, that user may be assigned to a different buffer.

Two or more users may transmits request for a change in configuration of the network device contemporaneously because the configuration data associated with each user will be stored in a separate buffer. A user can save configuration data to the network device independent of the activity of any other user. A user can modify the configuration of the network device when other users are transmitting requests for a change in configuration of the same network device, except as discussed below, e.g., a user may be prevented from modifying the configuration of the network device if that user cannot obtain an exclusive lock. After the processing of step 220, processing proceeds to step 230.

In step 230, a second request to modify the current operational state of the network device to reflect the configuration data stored in the buffer is received. Request interface 132 may receive the second request from client 110. The second request of step 230 is transmitted from the same user or party as the first request of step 210. As explained above, when request interface 132 determines that the second request of step 230 concerns the configuration of the network device, request interface 132 communicates with configuration manager 134 to inform configuration manager 134 of the second request of step 230. If the network device comprises more than one buffer, then the second request of step 230 refers to the buffer that is associated with the user or party that transmitted the second request of step 230. After the performance of step 230, processing proceeds to step 240.

In step 240, an exclusive lock on the network device is obtained, through either an explicit or implicit request. In an embodiment, configuration manager 134 may obtain the exclusive lock for a user associated with the second request. Having possession of the exclusive lock prevents another user from changing the current operational state of the network device. In effect, once the exclusive lock is obtained on the network device, the "second stage" is entered.

In one embodiment, a user may obtain an exclusive lock by submitting an explicit request for the exclusive lock using a specified command. In that embodiment, after the network device processing a request from a user for the exclusive lock, that user has the exclusive lock until the exclusive lock is released. In another embodiment, whenever a user submits a request to modify the current operational state of the network device to reflect the configuration data stored in a buffer, the network device interprets the request as an implicit request for a lock, and that user may automatically obtain the exclusive lock unless another user already holds the exclusive lock. In an embodiment, if a user is unable to obtain the exclusive lock, that user may be notified that the request was not performed because the user could not obtain the exclusive lock. The user must wait until the lock is released and attempt the commit operation again. Requesting the lock explicitly provides a way to ensure that the lock is obtained before the commit operation is requested. However, obtaining an exclusive lock does not guarantee that a commit of a configuration will succeed; for example, if a back-end system failure occurs, then the configuration for which a commit is requested may not become part of the operational state of the network device. After the performance of step 240, processing proceeds to step 250.

In step 250, the current operational state of the network device is modified to reflect the configuration data. Note that the current operational state of the network device is modified to reflect the configuration data is step 250 only upon obtaining the exclusive lock either explicitly or implicitly. Step 240 may be performed by configuration manager 134. As a result of configuration manager 134 performing step 250, the current operational state of the network device reflects the configuration data that was stored in the buffer in step 220. In an embodiment, after the performance of step 240, the configuration data stored in the buffer is removed.

As all configuration changes identified in the configuration data are made to network device 130 contemporaneously in step 250, significant performance benefits are achieved. Effecting multiple configuration changes contemporaneously is more efficient than applying each configuration change to network device 130 individually.

Applications of Storing Configuration Data in Device Configuration Database

Embodiments store configuration data to enable a user to modify the configuration of the network device to reflect the configuration of the network device at an earlier point in time. A historical record of the configuration data that has been used to modify the current operational state of the network device may also be viewed by a user associated with client 110. Configuration data may describe any changes made to the operational state of network device 130 or any node 138 on network device 130.

Whenever a request to modify the current operational state of the network device to reflect a set of configuration data is performed, such as when step 250 of FIG. 2 is performed, the configuration data is persistently stored. In an embodiment, in performing step 250, configuration manager 134 instructs data manager 136 to store the configuration data, or a reference to where the configuration data is stored, in device configuration database 140. In an alternate embodiment, data manager 136 may persistently store the configuration data, or a reference to where the configuration data is stored, at network device 130.

In an embodiment, data manager 136 stores the configuration data in a binary file in device configuration database 140, where device configuration database 140 is a hierarchical database. The binary file references information that describes, for each of the one or more configuration changes described in the configuration data, details about the configuration change. For example, the binary file could reference information that describes, for each configuration change, when the configuration change was made (for example, a timestamp), what user initiated the configuration change, which client application transmitted the request to make the configuration change, and a location from which the configuration change was initiated (for example, which client or port on the client initiated the request).

In an embodiment, device configuration database 140 stores configuration history data. Configuration history data is data that describes all changes in the operational state of the network device that occur over a period of time. Configuration history data may be generated by aggregating the configuration data stored in device configuration database 140.

Configuration manager 134 can process a request from client 110 to view the configuration history data. Configuration manager 134 may retrieve configuration history data associated with a particular point in time or a particular state of network device 130 and transmit the configuration history data to client 110. In this manner, client 110 may view configuration history data of network device 130 associated with any point in time or any state of network device 130. In an embodiment wherein the configuration data describes a set of changes made between operational states of network device 130, rather than fully describing the complete configuration of network device 130, configuration manager 134 may dynamically determine information that fully describes the configuration of network device 130 at the desired particular point in time or state by applying the set of changes described in the configuration data to a base configuration, as described in further detail below.

Client 110 may view the set of configuration changes made from a first operational state to a second operational state of network device 130. If client 110 transmits a request to network device 130 to view configuration data with reference to a first point in time and a second point in time, configuration manager 134 can use the configuration history data to determine a set of configuration changes between the operational state of the network device associated with the first point in time and the operational state of the network device associated with the second point in time.

The set of configuration changes generated by configuration manager 134 between two operational states of the network device may be generated either from a forward-looking perspective or from a backward-looking perspective. In other words, for a given starting point in time, the configuration manager 134 can use the configuration history data to generate a set of configuration changes associated with an operational state that is earlier than the starting point or later than the starting point. The requested information about the configuration changes may then be transmitted from network device 130 to client 110.

In an embodiment, for a particular configuration change made to network device 130, device configuration database 140 may only store data that describes only a set of configuration options that changed from a first operational state of network device 130 to a second operational state of network device 130, rather than storing data that fully describes the second operation state of network device 130. For example, if only 10% of the configuration changed from a first operational state of the network device to a second operational state of the network device, then only the configuration data that reflects the 10% of the configuration of the network device that changed is stored in device configuration database 140. As the configuration history data allows configuration manager 134 to identify the operational state of the network device at an earlier point in time, only the difference between operational states of the network device needs to be stored in order for configuration manager 134 to determine the complete state of the network device at any point in time since configuration history data was stored.

Since data that describes all changes in the operational state of the network device that occur over a period of time is stored in the device configuration database as configuration history data, the current operational state of the network device may be "rolled back" or returned to an operational state associated with an earlier point in time. A request from a user maybe processed wherein the current state of the network device is changed to reflect the configuration data associated with an earlier point in time. Since a user associated with client 110 may view the configuration data associated with any operational state of network device 130 that is reflected in the configuration history data, the user may view prior configuration data applied to the operational state of the network device 130 and roll back the current operational state of the network device 130 to reflect that configuration data. Consequently, any user of client 110 can alter the configuration of network device 130 to correspond to any prior configuration state, and that user can view information that describes the configuration of any prior state of network device 130, which enable the user to understand exactly what the configuration of network device 130 will be before the rollback operation is made.

In an embodiment, the configuration of the current operational state of the network device may only be returned to an operational state associated with an earlier point in time if a user has a sufficient privilege level. For example, the user may need to be a "root" user to perform a rollback operation. To illustrate, assume a request to change the configuration of the network device from the current operational state of the network device to a prior operational state of the network device is received by request interface 132. Thereafter, request interface 132 forwards the request to configuration manager 134. Configuration manager 134 determines if the user associated with the request has a sufficient privilege level for the request to be performed. Configuration manager 134 only changes the configuration of the network device from the current operational state of the network device to a prior operational state of the network device specified in the request upon determining that the user has the sufficient privilege level for the request to be performed Data manager 136 may periodically perform a rebase operation. A rebase operation creates a new base configuration from the set of configuration history data stored in device configuration database 140. Network device 130 loads (or "boots") a base configuration whenever network device 130 is initially turned on. If one or more configuration changes have been made to the base configuration, then the network device 130 applies those configuration changes to the base configuration to ensure the configuration of network device 130 is current. Performing a periodic rebase operation advantageously reduces the number of configuration changes that need to be applied to the base configuration. Data manager 136 may perform a rebase operation in response to a variety of events, e.g., (a) the number of commits performed on network device 130 exceeds a configurable threshold, or (b) the size of the configuration data stored in device configuration database 140, or a portion therefore, exceeds a configurable threshold.

Data manager 136 may periodically perform a trim operation. A trim operation is an operation to reduce the amount of configuration changes that are stored in the device configuration database 140 by deleting the oldest configuration changes in the configuration history data. A trim operation reduces the amount of storage space required to store configuration history data. A trim operation may advantageously remove configuration changes made to network device 130 that are no longer needed, e.g., a rebase operation may make storing a particular configuration change made to network device 130 unnecessary if the base configuration already reflects that configuration change. Data manager 136 may perform a trim operation in response to a variety of events, e.g., (a) the number of commits performed on network device 130 exceeds a configurable threshold, (b) the size of the configuration data stored in device configuration database 140, or a portion therefore, exceeds a configurable threshold, (c) the passage of a configurable amount of time, or (d) in response to a request issued by client 110.

Error Checking

In an embodiment, configuration manager 134 may comprise a parser. A parser is any component that is capable of determining whether a request contains an error or is otherwise unable to be performed. The parser may be used by configuration manager 134 to determine whether a request contains one or more syntax errors. In an embodiment, only a received request for a change in the configuration of the network device associated with a user that has not yet obtained the exclusive lock on the network device is processed to determine whether the request contains one or more syntax errors.

In response to a determination that a request contains one or more syntax errors, a communication may be transmitted from the network device to the user that transmitted the request containing the one or more syntax errors. The communication may comprise information about the determination that a request contains one or more syntax errors, e.g., a description of the one or more syntax errors that are contained with the request. Alternatively, if the communication sent to the user does not describe the one or more syntax errors that are contained with the command, a second communication that does describe the one or more syntax errors that are contained with the command may be sent to the user in response to receiving a request for that information from the user.

In an embodiment, configuration manager 134 may determine whether a request contains one or more semantic errors or one or more verification errors. In an embodiment, configuration manager 134 only determines whether a request contains one or more semantic errors or one or more verification errors if a user associated with the request has obtained an exclusive lock on the network device, and the user has transmitted a request to network device 130 to modify the current operational state of network device 130 to reflect configuration data stored in the buffer. Semantic errors and verification errors generally arise from back end processing entities that cannot process the request. For example, semantic errors and verification errors include a duplicate IP address contained within the request and inclusion of a user name or user group that does not exist.

In response to determining that a request contains one or more semantic errors or one or more verification errors, configuration manager 134 may transmit a communication to the user issuing the request that indicates information about the determination that the request contains one or more semantic errors or one or more verification errors, e.g., the communication may describe the one or more semantic errors or one or more verification errors found within the request.

Executing Atomic and Best Effort Configuration Changes

Embodiments provide for processing a request based on whether the particular request is an "atomic" request or a "best effort" request. An "atomic" request is a request that is performed only if it is determined that each of the one or more configuration changes described by the configuration data associated with the request is capable of being performed. Thus, if a request is an atomic request, if any of the one or more configuration change described by the configuration data associated with the request cannot be performed, then none of the configuration changes described by the configuration data associated with the request are performed.

In an embodiment that processes atomic requests, configuration manager 134 determines if a request requires that each of the one or more configuration changes described by the configuration data associated with the request be performed. In response to a determination that the request requires that each of the one or more configuration changes described by the configuration data associated with the request be performed, the configuration manager 134 determines if each of the one or more configuration changes is capable of being performed. Thereafter, if each of the one or more configuration changes is capable of being performed, then the configuration manager 134 modifies the current operational state of the network device to reflect the configuration data.

A "best effort" request, on the other hand, is a request that is executed regardless of whether a particular configuration change described by the configuration data associated with the request is not capable of being performed. Thus, if a request is a best effort request, even if one or more of the configuration changes described by the configuration data associated with the request cannot be performed, then the one or more configuration changes described by the configuration data that are capable of being performed are still performed.

In an embodiment that processes best effort requests, configuration manager 134 determining if the request requires that each of the one or more configuration changes described by the configuration data associated with the request be performed. In response to a determination that the request does not require that each of the one or more configuration changes described by the configuration data associated with the request be performed, then the configuration manager 134 modifies the current operational state of the network device to reflect any of the one or more configuration changes described by the configuration data that can be performed, even if one or more configuration changes described by the configuration data associated with the request are not capable of being performed.

XML Interface for Two-Stage Configuration Operations

Client 110 may transmit a XML document over communications link 120 to request interface 132. The XML document may contain one or more requests that are formatted according to any of a variety of request syntax conventions, such as the Cisco CLI syntax. The XML document may be sent to the network device using any of several transport mechanisms including CORBA, Telnet, SSH, etc. Any request may be contained in the XML document, e.g., any request in Table 1 may be contained within an XML document. Also, a request contained within an XML document may be associated with different types of management operations. For example, the request may be to (a) manipulate the native management data on the network device, e.g., by processing operations to get, set (i.e., modify), create, or delete instances of management data, (b) process an operation regarding more advanced configuration services on the network device, e.g., a lock operation, an unlock operation, a commit operation, or a rollback operation, or (c) perform a command line interface (CLI) operation.

Note that subsequent requests from the client to the network device and/or responses from the network device to the client which are contained within XML documents may be associated with different types of management operations than of the prior requests. Each request from a client to a network device may view the effects of other requests, even if those requests are of different types of management operations. For example, a first request contained within an XML document may cause configuration data to be stored in a buffer, while a second request contained within an XML document may be associated may view the configuration data stored in the buffer, even if the second request is associated with a different type of management operation than the first request.

Request interface 132 may process the received XML document to extract any requests in the XML document, and thereafter forward those requests to configuration manager 134 so that the requests may be processed. An illustrative example of an XML document containing multiple requests (or operations) sent from client 110 to network device 130 is described below in the pseudocode of Example 1.

EXAMPLE 1

```
<?xml version = "1.0" encoding = "UTF-8"?>
<Request MajorVersion = "1" MinorVersion = "0">
    <Operation 1>
    ...
    Operation 1 data is contained here.
    ...
    </Operation 1>
    <Operation 2>
    ...
    Operation 2 data is contained here.
    ...
    </Operation 2>
</Request>
```

In response to receiving the XML document illustrated in Example 1, configuration manager 134 processes the requests contained therein. Request interface 134 may forward any embedded commands within the XML document that relate to the configuration of network device 130 to configuration manager 134. After configuration manager 134 has processed the request, request interface 132 may transmit response data that describes a result of processing the request on network device 130 to client 110. An illustrative example of an XML document containing response data sent from network device 130 to client 110 is described below in the pseudocode of Example 2.

EXAMPLE 2

```
<?xml version = "1.0" encoding = "UTF-8"?>
<Response MajorVersion = "1" MinorVersion = "0">
    <Operation 1>
    ...
    Operation 1 response data is contained here.
    ...
    </Operation 1>
    <Operation 2>
    ...
    Operation 2 response data is contained here.
    ...
    </Operation 2>
</Response>
```

Note that the XML document sent from client 110 of Example 1 circumscribes requests with a "Request" tag, while the XML document sent from network device 130 of Example 2 circumscribes response data with a "Response" tag.

Client 110 may transmit an XML document to network device 130 to request the current running BGP configuration of network device 130, as shown below in Example 3.

EXAMPLE 3

```
<?xml version = "1.0" encoding = "UTF-8"?>
<Request MajorVersion = "1" MinorVersion = "0">
    <Get>
        <Configuration Source ="CurrentConfig">
            <BGP MajorVersion = "1" MinorVersion ="0"/>
        </Configuration>
    </Get>
</Request>
```

In response to receiving the XML document of Example 3, network device 130 may transmit an XML document containing the current running BGP configuration of network device 130, as shown below in Example 4.

EXAMPLE 4

```
<?xml version = "1.0" encoding = "UTF-8"?>
<Response MajorVersion = "1" MinorVersion = "0">
    <Get>
        <Configuration>
            <BGP MajorVersion = "1" MinorVersion ="0">
                <AS>
                    <Naming>
                        <AS>3</AS>
                    </Naming>
                    <Global>
                        <DefaultMetric>5</DefaultMetric>
                        <GlobalTimers>
                            <Keepalive>30</Keepalive>
                            <Holdtime>90</Holdtime>
                        </GlobalTimers>
                        ...
                        More BGP config data returned here.
                        ...
                </BGP>
        </Configuration>
    </Get>
</Response>
```

Client 110 may transmit to network device 130 an XML document containing configuration data which will be stored in the buffer of network device 130, as shown below in Example 5.

EXAMPLE 5

```
<?xml version = "1.0" encoding = "UTF-8"?>
<Request MajorVersion = "1" MinorVersion = "0">
    <Set>
        <Configuration>
            <BGP MajorVersion = "1" MinorVersion ="0">
                <AS>
                    <Naming>
                        <AS>3</AS>
                    </Naming>
                    <Global>
                        <DefaultMetric>10</DefaultMetric>
                        <GlobalTimers>
                            <Keepalive>60</Keepalive>
```

-continued

```
                            <Holdtime>180</Holdtime>
                        </GlobalTimers>
                    </Global>
                </AS>
            </BGP>
        </Configuration>
    </Set>
</Request>
```

In response to receiving the XML document of Example 5, network device 130 may transmit an XML document containing an acknowledgement that the configuration data has been received and stored in the buffer, as shown below in Example 6.

EXAMPLE 6

```
<?xml version = "1.0" encoding = "UTF-8"?>
<Response MajorVersion = "1" MinorVersion = "0">
    <Set>
        <Configuration/>
    </Set>
</Response>
```

Client 110 may transmit to network device 130 an XML document containing a request to commit configuration data stored in the buffer of network device 130, as shown below in the Example 7.

EXAMPLE 7

```
<?xml version = "1.0" encoding = "UTF-8"?>
<Request MajorVersion = "1" MinorVersion = "0">
    <Commit Mode ="Atomic" Label ="BGPUpdate"
    Comment = "Sample BGP config update"/>
</Request>
```

In response to receiving the commit request contained within the XML document of Example 7, network device 130 may transmit an XML document containing an acknowledgement that the commit request has been performed, as shown below in Example 8.

EXAMPLE 8

```
<?xml version = "1.0" encoding = "UTF-8"?>
<Response MajorVersion = "1" MinorVersion = "0">
    <Commit Mode ="Atomic" Label ="BGPUpdate"
    Comment ="Sample BGP config update"/>
</Response>
```

Note that a request from client 110 to network device 130, which is contained within an XML document, may correspond to a first type of management operation, and the response from the network device 130 to the client 110, which is contained within another XML document, may correspond to a second type of management operation. This may be advantageous when a user associated with client 110 is more accustomed to issuing requests to network device 130 that correspond to a first type of management operation, but prefers to view information about the results of processing the request on network device 130 in accordance with a second type of management operation. Example 9, shown below, illustrates a request from client 110 to network device 130, contained within an XML document, that corresponds to a manipulation of the native management data on network device 130. Example 10, shown below, illustrates a response from network device 130 to client 110, contained within an XML document, that corresponds to a CLI management operation that is made in response to the request of Example 9.

EXAMPLE 9

```
<?xml version="1.0" encoding="UTF-8"?>
<Request>
    <Set>
        <Configuration>
            <BGP>
                <AS>
                    <Naming>
                        <AS>65001</AS>
                    </Naming>
                    <Global>
                        <GlobalAFTable>
                            <GlobalAF>
                                <Naming>
                                    <AF>IPv4Unicast</AF>
                                </Naming>
                                <SourcedNetworkTable>
                                    <SourcedNetwork>
                                        <Naming>
                                            <Network>
                                                <IPV4Address>202.202.11.11
                                                </IPV4Address>
                                                <IPV4PrefixLength>32</IPV4PrefixLength>
                                            </Network>
                                        </Naming>
                                    </SourcedNetwork>
                                </SourcedNetworkTable>
                            </GlobalAF>
                        </GlobalAFTable>
                    </Global>
                </AS>
            </BGP>
        </Configuration>
    </Set>
</Request>
<?xml version="1.0" encoding="UTF-8"?>
<Request MajorVersion="1" MinorVersion="0">
    <CLI>
        <Configuration>
            show config
        </Configuration>
    </CLI>
</Request>
```

EXAMPLE 10

```
<?xml version="1.0" encoding="UTF-8"?>
<Response MajorVersion="1" MinorVersion="0">
    <CLI>
        <Configuration>
            Building configuration . . .
            router bgp 65001
            address-family ipv4 unicast
            network 202.202.11.11/32
            !
```

-continued

```
            !
            end
        </Configuration>
    </CLI>
</Response>
```

Note that any request of any type of management operation that client 110 may issue to network device 130 may be contained within an XML document and processed according to the above explanation. Each command of any management operation may be identified by a particular tag and associated values in an XML document. Accordingly, not every request has been shown in an illustrative example; however, those skilled in the art will appreciate that any type of management operation that client 110 may issue to network device 130 may be contained within an XML document and processed according to embodiments of the invention.

Configuration Session Management and Locking

As explained above, users of clients, e.g., client 110, may obtain an exclusive lock on network device 130 which prevents another user to effect configuration changes on network device 130 while that user has the lock. If a first user attempts to modify the current operational state of network device 130 while a second user has an exclusive lock, then the request of the first user will be aborted by the configuration manager 134.

There are two types of exclusive locks: implicit and explicit. An implicit lock is obtained whenever a user initiates a request to modify the current operational state of network device 130 to reflect the configuration data stored in a buffer, e.g., when step 250 of FIG. 2 is performed. This implicit lock prevents a second user from making any configuration changes to network device 130 while a first user is in the process of making configuration changes to network device 130.

On the other hand, an explicit lock is obtained whenever a user specifically requests a lock unaccompanied by a request to modify the operational state of network device 130. An explicit lock is advantageous where a user does not wish another user to be able to modify the operational state of network device 130.

A client may transmit to network device 130 a request to determine which users are operational connected to network device 130 and which user has the exclusive lock. Configuration manger 134 maintains information about which users are connected to network device 130 and which user has the exclusive lock, including information about the session id of each user connected to network device 130, a timestamp associated with each user connected to network device 130, a username associated with each user connected to network device 130, a location identifier associated with each user connected to network device 130, and whether each user connected to network device 130 has an exclusive lock. Configuration manager 134 may process a request for this information received by network device 130 and thereafter cause a response to be transmitted to the requesting client that contains any information maintained by configuration manager 134 about the users connected to network device 130, such as information about which user has the exclusive lock.

Client 110 may transmit an XML document over communications link 120 to network device 130 that contains a request to obtain an exclusive lock. If the request is successful, network device 130 transmits a communication informing client 110 that client 110 has the exclusive lock. On the other hand, if the request is not successful, network device 130 transmits a communication informing client 110 why the exclusive lock was not obtained, e.g., an error code or error message may be provided to client 110. Example 11 illustrates a portion of a XML document that client 110 may transmit to network device 130 to request an exclusive lock.

EXAMPLE 11

```
<?xml version = "1.0" encoding = "UTF-8"?>
<Request MajorVersion = "1" MinorVersion = "0">
    <Lock/>
</Request>
```

In response to receiving the request for an exclusive lock contained within the XML document of Example 11, network device 130 may transmit the XML document of Example 12 to client 110 to indicate that client 110 has the exclusive lock.

EXAMPLE 12

```
<?xml version = "1.0" encoding = "UTF-8"?>
<Response MajorVersion = "1" MinorVersion = "0">
    <Lock/>
</Response>
```

Example 13 illustrates a portion of a XML document that client 110 may transmit to network device 130 to release the exclusive lock.

EXAMPLE 13

```
<?xml version = "1.0" encoding = "UTF-8"?>
<Request MajorVersion = "1" MinorVersion = "0">
    <Unlock/>
</Request>
```

In response to receiving the request to release the exclusive lock contained within the XML document of Example 13, network device 130 may transmit the XML document of Example 14 to client 110 to indicate that client 110 has released the exclusive lock.

EXAMPLE 14

```
<?xml version = "1.0" encoding = "UTF-8"?>
<Response MajorVersion = "1" MinorVersion = "0">
    <Unlock/>
</Response>
```

Multiple users may be operational connected to network device 130. In an embodiment, each user of a plurality of users may view the configuration data that another user of the plurality of users has saved in a buffer of network device 130. In this way, one user can view the configuration changes that another user is making to network device 130.

As mentioned above, configuration manger 134 maintains information about which users are connected to network device 130 and which user has the exclusive lock Network device 130 maintains information. Consequently, a user of client 110 may transmit a request to network device 130, which when processed by configuration manager 134, causes information to be sent to client 110 that describes which users are actively editing network device 130 and whether an exclusive lock has been assigned to any other user.

Configuration Versioning and Partitioning

An embodiment of the invention provides for automatic handling of configuration changes during software upgrades and other installation or removal of modular software elements of a network device. According to one embodiment, the need for user intervention, to locate and address configuration issues during software package activation, deactivation, upgrade, or downgrade, is eliminated.

Embodiments are particularly useful in network devices and other systems that provide for dynamic software upgrades. In one embodiment, a network device or other system operates under the control of software code base that is organized as a plurality of discrete components or modules, and the components are organized in packages. The complete set of configuration instructions for the system, termed "configuration" herein, is structured into one or more namespaces and partitions that correspond to software components and packages that implement technology features to which the configuration namespaces and partitions relate.

Figure 4:
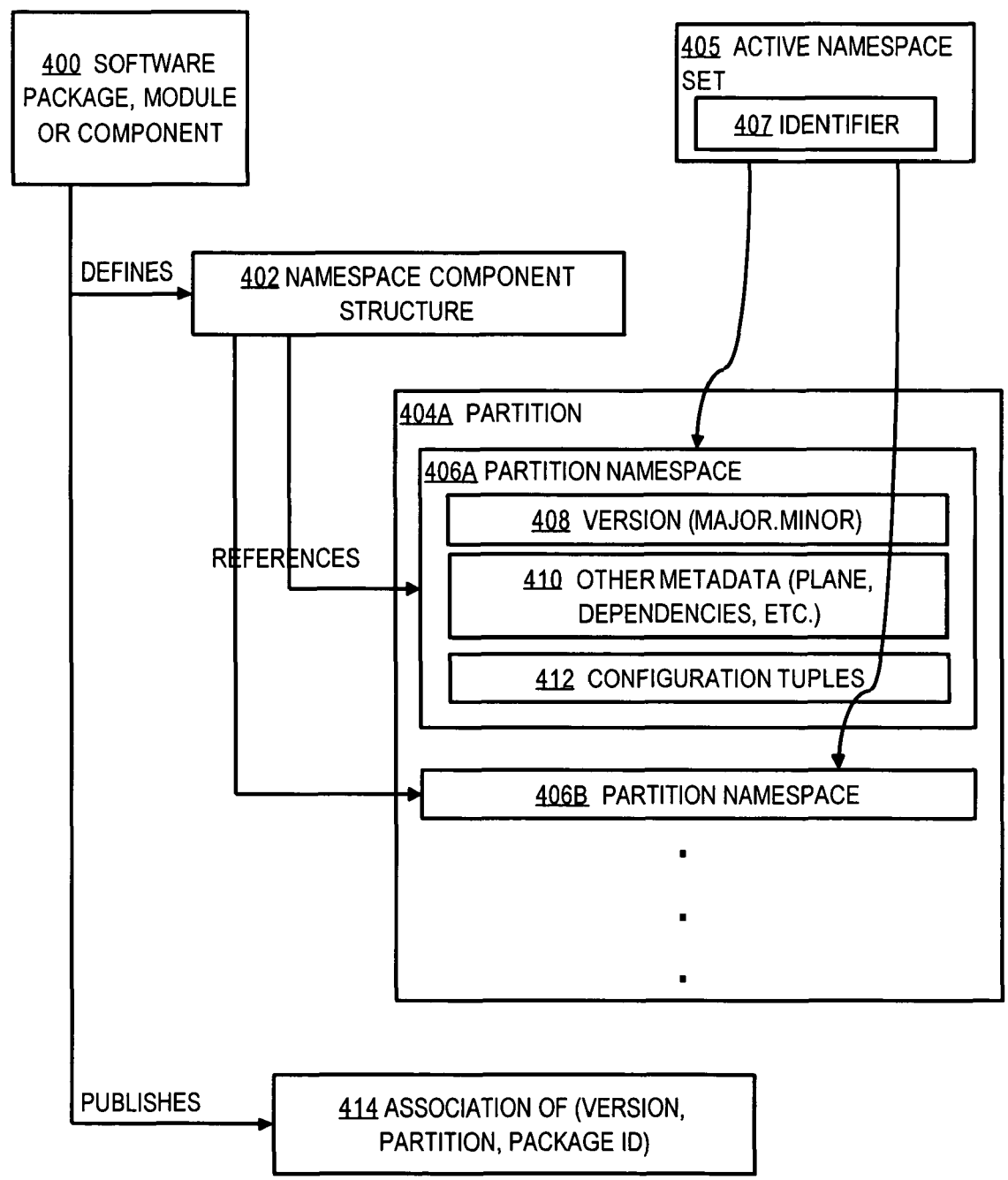
FIG. 4 is a block diagram showing a partitioned configuration and relationships of configuration partition namespaces to software packages, modules or components.
Figure 5:
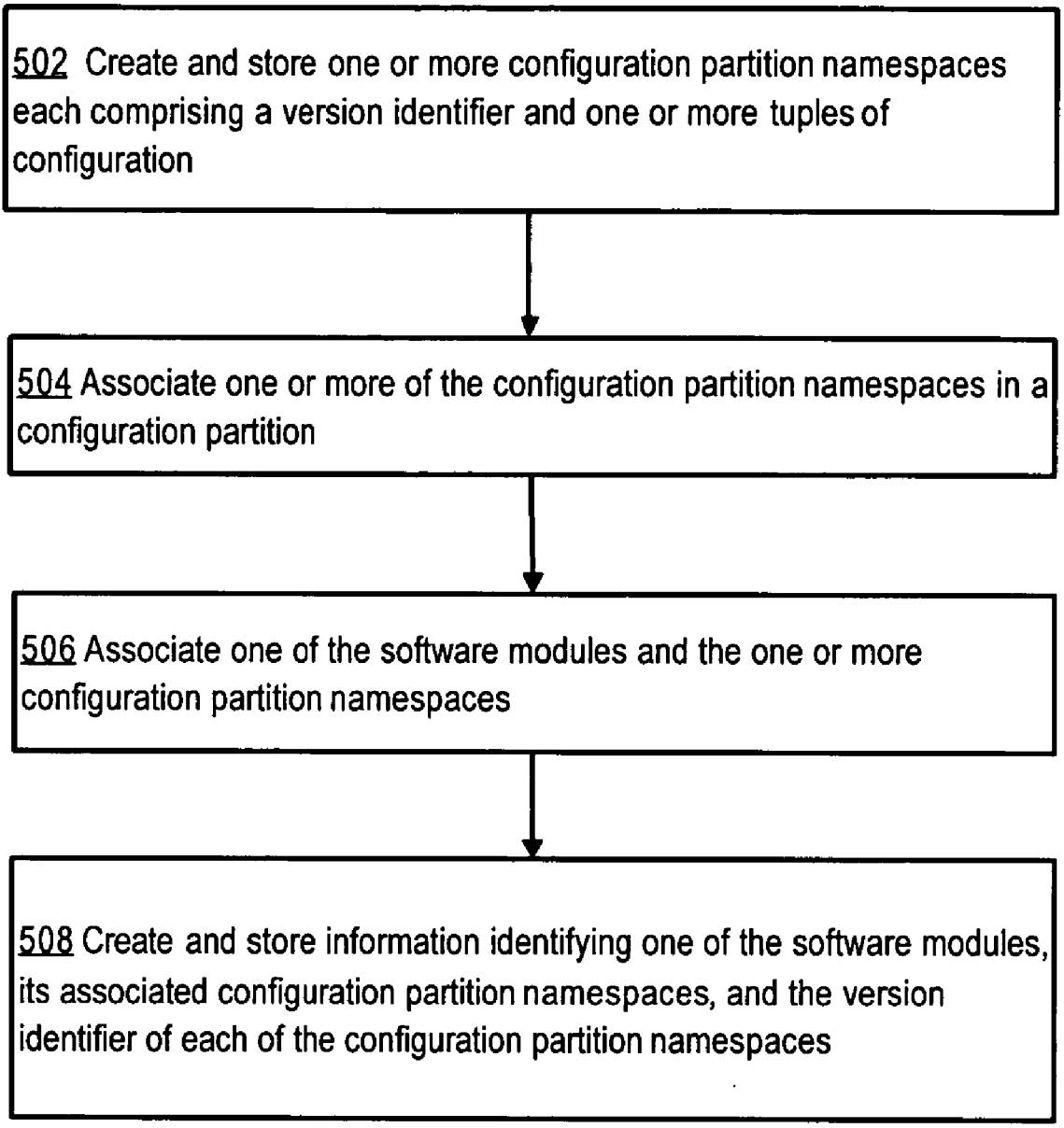
FIG. 5 is a flow diagram of a process of creating configuration partitions.

FIG. 4 is a block diagram showing a partitioned configuration and relationships of configuration partition namespaces to software packages, modules or components, in one example embodiment. An alternative embodiment is also described below. FIG. 5 is a flow diagram of a process of creating configuration partitions. The process of FIG. 5 may be used to create structures as shown in FIG. 4. The process of FIG. 5 may be performed by a configuration manager process that supervises loading a configuration at boot-up time for a large-scale router having distributed processor architecture. The techniques described herein are equally applicable to software packages, modules or components. In this description, the term "component" refers to any form of software element including a package or module.

Referring first to FIG. 5, in step 502, one or more configuration partition namespaces are created and stored. Each namespace comprises a version identifier and one or more tuples of configuration data. In step 504, one or more of the configuration partition namespaces are associated in a configuration partition. A software component is associated with the one or more namespaces at step 506.

As seen in FIG. 4, through the steps of FIG. 5 a software component 400 defines a configuration namespace component structure 402. The namespace component structure 402 references one or more configuration partition namespaces 406A, 406B, etc. Alternatively, the namespace component structure 402 is omitted and a component 400 publishes one or more namespaces. Each of the partition namespaces 406A, 406B comprises one or more configuration tuples 412 as well as metadata such as a version number 408 and other metadata 410. The configuration tuples 412 each comprise associations of configuration commands and parameter values. The partition namespaces 406A, 406B may be organized in a configuration partition 404A. Thus, one or more components 400 that relate to a portion of configuration define at least one namespace 406A that includes or contains a unique set of configuration tuples 412. A partition 404A is a second-level grouping or container of namespaces that can be manipulated as a whole. As a result, a namespace 406A, 406B identifies and associates a set of configuration data with a software element.

In the embodiment of FIG. 4, metadata 410 comprises values for attributes relevant to the software component 400 and its corresponding configuration, such as a type value, plane value, strings describing tuples, dependencies on other namespaces, etc. In another embodiment, a component 400 may have multiple associated partitions 404A; however, a particular partition 404A is associated only with one component 400. Partitions may be associated with nodes of a large-scale router having a distributed processor architecture, with an administration plane, with a feature configuration, etc. For example, in one embodiment each logical interface of a network device has a different configuration partition. Logical interfaces may comprise loop back interfaces, tunnel interfaces, bundle interfaces, the Null interface, etc. Each type of interface may have a separate configuration partition that holds configuration for all interfaces of that type.

Step 508 of FIG. 5 provides for creating and storing information identifying one of the software components, its associated configuration partition namespaces, and the version identifier of each of the configuration partition namespaces. As shown in FIG. 4, each component 400 publishes an association 414 of a version number, partition, and component identifier. In one embodiment, publishing the association 414 comprises a component storing one or more entries that define namespaces in an API export file. Using association 414, a configuration manager or other external process can determine what partition 404A, namespaces 406A, 406B, and configuration tuples 412 are affected by installing or removing the component 400.

The association 414 is established at the time that component 400 is compiled and incorporated with other software components to create a complete operating system for the network device ("build time"). Thus, the steps of FIG. 5 may be performed at build time. The steps of FIG. 5 are performed for all components that make up a complete operating system or application for a system, such as a network device.

Using the approaches of FIG. 4 and FIG. 5, namespaces are used to divide a large overall configuration into manageable pieces.

In one embodiment, version number 408 is structured as a two-part value consisting of a major version number and minor version number. Use of a version number 408 as part of a partition namespace 406A enables the configuration structure of FIG. 4 to track changes that occur in software component 400. For example, as component 400 is modified or updated, the component might add new configuration, drop some existing configuration, or change the interpretation of some existing configuration represented in configuration tuples 412. As such changes occur, the version number 408 is modified.

In an embodiment, an active namespace set 405 references all partition namespaces 406A, 406B that are active for all software components 400 that are installed and running on the network device. The active namespace set 405 includes a unique identifier 407. Use of the namespace set 405 to support configuration rollback and other functions is described further below.

In another embodiment, a software image, e.g., for an operating system and applications for a distributed router, comprises a collection of packages, including one or more mandatory packages and one or more optional packages. A package is a collection of one or more software components. Most components provide functional features, and some components just publish partitions.

In this embodiment, each component may publish one or more namespaces. A namespace is a collection of configuration tuples, which may be implemented as strings of data, a version number, and some other attributes. A namespace does not contain information about the partition to which it belongs.

A package may publish a one or more partitions. For example, the routing package publishes five partitions, corresponding to key functional areas such as BGP, ISIS, OSPF, static routes, and routing policy. A partition refers to a set of namespaces where both the partition and the namespace belong to the same package. A live router has an active set of packages, partitions and namespaces.

As a concrete example, assume that a routing package has many components that provide implementations of protocols or features such as BGP, OSPF, ISIS, Policy, and Static Routes. A set of components implementing a feature like BGP publishes one or more namespaces for BGP. The routing package has a component that publishes a partition for BGP. The BGP partition only refers to the BGP namespaces, the OSPF partition refers only to the OSPF namespaces, etc.

In one specific embodiment, a configuration tuple is a string such as "/cfg/gl/a/hostname" or "/cfg/if/act/POS0_7_0/ip_address". Each tuple has a well-defined root element, such as "/cfg/gl/" or "/cfg/if/act/". A relatively small number of tuple roots are defined. In a namespace, all configuration tuples have a common root. Thus, a developer cannot define a namespace containing "/cfg/gl/foo" and "/cfg/if/act/bar" tuples, because the roots ("/cfg/gl" and "/cfg/if") are different. A partition may be viewed as simply a logical grouping or set of namespaces having a common root. Further, a component 400 may "own" and therefore have exclusive responsibility to define a namespace, and system designers may independently determine how to organize namespaces into partitions.

In this embodiment, a namespace definition does not include the tuple root. As an example, if an MPLS component owns tuples named "/cfg/gl/mpls/string1" and "/cfg/gl/mpls/string2", the namespace definition specifies only the strings "MPLS/.*" and the root element "/cfg/gl/" is not defined.

A powerful benefit of this configuration is that that definitions of configuration tuples become mobile. A consequence of the point above is "mobility". Structural changes to the system namespace have little or no impact on the component. If the root is changed from "/cfg/gl/" to "/cfg/gl/router-id/", no change is needed in the namespace definitions. To facilitate this benefit, implementing code should treat a tuple root as an opaque string.

In addition, because a namespace does not contain information about the partition to which it belongs, changes in partitions do not require changes in namespaces. For example, BGP namespaces could be moved from one partition to another without any change to the namespace or to its associated components.

The namespaces can be bound to a partition statically, at compile time, or dynamically. For example, a partition containing BGP namespaces might have a large amount of run time configuration commands or statements. To achieve load balancing on a multi-node system, a designer can split the BGP partition into per-node BGP configuration blocks at run time.

Since namespaces are independent of partitions, system designers are free to attach and change certain attributes to partitions without requiring any changes in the namespaces. Further, system designers can specify a partial or total order dependency between partitions, and the system will process partitions according to the dependency. In one embodiment, other metadata 410 includes a dependencies field that identifies a name of another partition 406B that must be applied before the configuration tuples 412 of the present partition namespace 406A. For example, routing policy configuration commands may need to be applied before routing protocol configuration commands. Configuration manager 134 (FIG. 1) reads the dependency field values and loads configuration tuples in the correct order. Such resolution of dependencies can be implemented as part of the process of FIG. 7, for example. Support for partial order provides possibilities of parallelizing and load balancing command processing in a distributed system for applying configuration commands.

In another embodiment, each partition may include one or more attribute values that signal a configuration manager whether to actively apply configuration commands ("push" the commands to a component) or whether the configuration manager 134 should wait for a component to request or "pull" its configuration commands. A "pull" attribute may be provided as part of other metadata 410, for example.

In one embodiment, a partition comprises platform dependent (PD) and platform independent (PI) namespaces. File names of the partition namespaces may indicate whether a particular namespace is platform dependent or independent. At compile time, depending on the image that is being built, a build manager merges all partition namespaces having a portion of their filenames in common into one file for export to a network device. The merge process can be driven by a PDL file or other build mapping indicating which components to use in the build. Thus, the build manager automatically retrieves the PD and PI namespaces necessary to create the defined partition. As a result, significant changes can be accomplished in the configuration infrastructure without changes in program code.

In an embodiment, the partition information and the namespace information for an image are stored in a set of data files that is integrated into an image. Thus, an image and its namespace information remain synchronized unless the image is somehow corrupted. As a result, an image always carries information defining its partitions and namespaces and therefore conveying information about configuration associated with it. Alternate approaches that separate such information from the image lead to inconsistencies or need elaborate mechanisms to maintain consistency.

Figure 6:
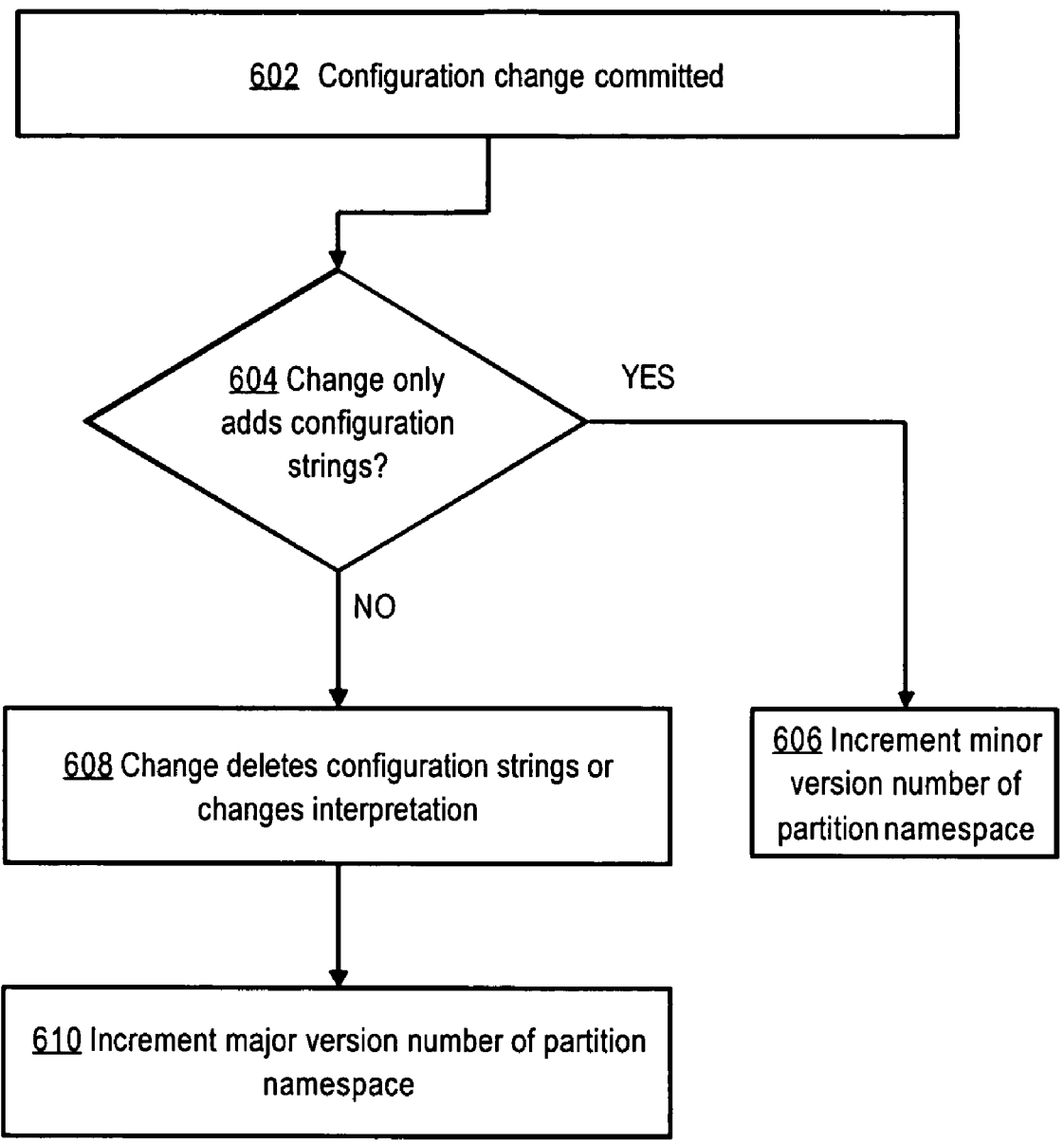
FIG. 6 is a flow diagram of processing version numbers in response to configuration changes.

FIG. 6 is a flow diagram of processing version numbers in response to configuration changes. In step 602, a configuration change is committed, for example, using the two-stage configuration model described herein. In step 604, a test is performed to determine whether the change only adds configuration strings to configuration tuples 412. If only new configuration strings are added to a namespace for a component, then only the minor version number of version number 408 is incremented. Only the minor version number is incremented because merely adding configuration is considered a backward-compatible change, because the component 400 can interpret the new configuration as well as all the old configuration.

In contrast, if a change results in deleting configuration strings or changing the interpretation of configuration strings, as shown in step 608, then the major version number is incremented, signifying an incompatible change, as shown in step 610.

Figure 7:
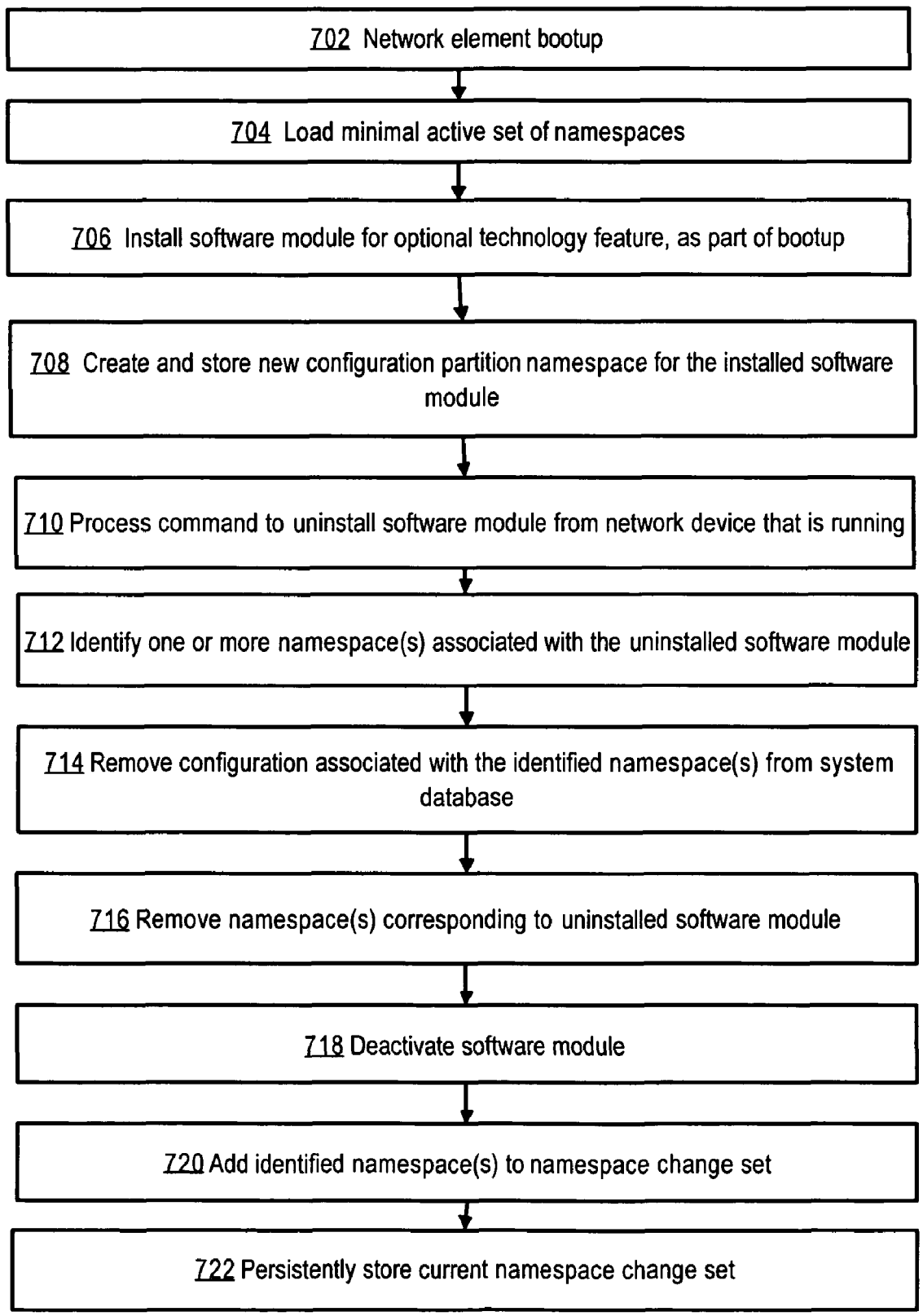
FIG. 7 is a flow diagram of processing installation and removal of software modules and associated configuration partitions.

FIG. 7 is a flow diagram of processing installation and removal of software components and associated configuration partitions. In an embodiment, installation and removal of software components and partitions occurs at the time that a network device using the present approach boots up. Thus, FIG. 7 begins when a network device performs a boot up process, as shown by step 702.

In step 704, the network device loads an operating system image that defines a minimal active set of namespaces and partitions on the device. Step 704 may also involve reading a startup configuration consisting of a single long file of configuration, partitioning the startup configuration according to the active namespaces, and saving the partitioned configuration in a plurality of files in a file system of the network device. Each partitioned configuration file is then applied to the network device in the order defined in the namespace component structure 402.

In step 706, a software component for an optional technology feature is installed as part of the boot up sequence. For example, one or more optional components for technology features such as MPLS, multicast, or security features are installed. In step 708, a new configuration partition namespace is created to correspond to the installed software component. Configuration associated with the installed software component is stored as part of the namespace in step 708.

Further, the active namespace set is updated to reference the new configuration partition namespace for the installed component. Thus, installing software components mutates the active namespace set 405 by adding references to namespaces for the installed components. Similarly, uninstalling any component mutates the active namespace set by removing the references to the corresponding namespaces. Therefore, at any point in time, the active namespace set 405 reflects all active software on the network device. In one embodiment, changes in installed components occur, and the active namespace set 405 mutates, only at two times: during boot time if the network device boots an image that is different from the previous active image on the device; and if a component is installed or uninstalled on the device while the device is running. Mutating the active namespace set 405 involves updating the active namespace set to reflect changes that have occurred in namespaces.

Steps 710-722 show processing that is performed when a component is uninstalled. When a component is uninstalled, its corresponding configuration is removed. Thus, in step 710, a command to uninstall a software component from a running network device is processed, as part of the boot up process initiated at step 702. In step 702, one or more namespaces associated with the component being uninstalled are identified. In step 714, configuration belonging to the identified namespaces is removed from a system database of the network device. In step 716, the identified namespaces are removed from the namespace set 405. In step 718, the specified component is deactivated.

In step 720, the identified namespaces are added to the active namespace set with information indicating a mutation in the active namespaces has occurred. Such information may include, for example, a timestamp and an indication of what was added or deleted. In step 722, a copy of the current active namespace set is persistently stored as a namespace change set.

A namespace change set may consist of a set of changed, new, and obsolete namespaces. A namespace change set cannot be an empty set. Because each namespace change set is stored in persistent storage, a configuration manager or other process can later traverse all stored namespace change sets in order to determine an arbitrary number of last active software changes on the network device. In one embodiment, one complete set of active namespaces, corresponding to the current active software set, is stored in the database for historical purposes, and previously active namespace sets are maintained as change sets. Change sets are bidirectional, indicating both added and deleted namespace sets. Given a complete set of namespaces and one or more change sets, the configuration manager can recreate the complete set as it existed at the time represented by any one of the change sets.

Figure 8:
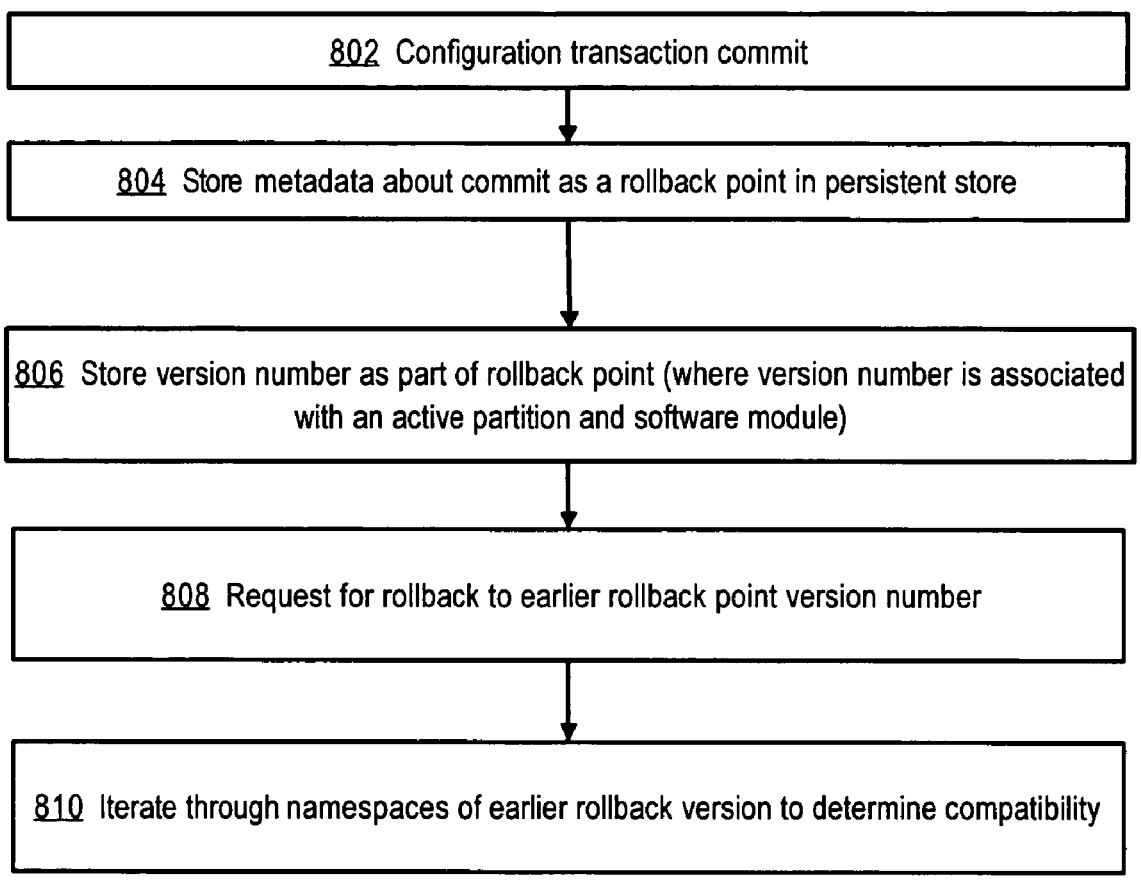
FIG. 8 is a flow diagram of processing configuration transaction commits and rollbacks with versioning.

FIG. 8 is a flow diagram of processing configuration transaction commits and rollbacks with versioning. In the two-stage configuration model described elsewhere herein, configuration changes generally involve specifying a configuration change and committing the change to the network device under control of an exclusive lock. As shown in step 802, a configuration transaction commit occurs. Metadata describing each configuration transaction commit is stored in persistent storage, such as disk, so that the network device can roll back to that commit at some point in the future, as shown by step 804. Persistently stored commits are referred to as rollback points. Each rollback point is stored in association with a version number that associates the commit with the active namespace set and active software components, as shown in step 806.

In an embodiment, the version number of a rollback point is the identifier 407 of the active namespace set 405. Any change to the active namespace set 405 causes a network device implementing the approaches herein to increment identifier 407. All subsequent commits are stored with the incremented identifier value until another change occurs in the active namespace set. Accordingly, each rollback point that is stored at step 804, 806 refers to a namespace set, and therefore step 806 also involves storing the corresponding active namespace set 405 in persistent storage.

In step 808, a request for a rollback to an earlier rollback point version number is received. When an operator attempts to roll back the current configuration to an older rollback point, the process of FIG. 8 determines configuration of namespaces associated with the rollback point are compatible with all current active software components. For example, the current software components may include an MPLS component with a namespace version of 2.0, while the rollback point committed when the active software components included an MPLS component with a namespace version of 1.0. In this case, the MPLS 2.0 component cannot interpret configuration tuples intended for the MPLS 1.0 component. However, persistently storing namespace change sets enables the process of FIG. 8 to recreate the namespace set that was active at each rollback point. An algorithm is then run in polynomial time to determine if the rollback is compatible. For example, in step 810, the process iterates through the namespaces of the earlier rollback version to determine compatibility. As another example, determining configuration compatibility depends on whether the rollback request of step 808 is requesting an atomic configuration restore operation or "best effort" restore operation. If an atomic operation is requested, then the operation is aborted if a configuration incompatibility is detected. If the restore operation type is best effort, the incompatible part of the configuration is removed and then the restore operation proceeds for the compatible part of the configuration.

Figure 9:
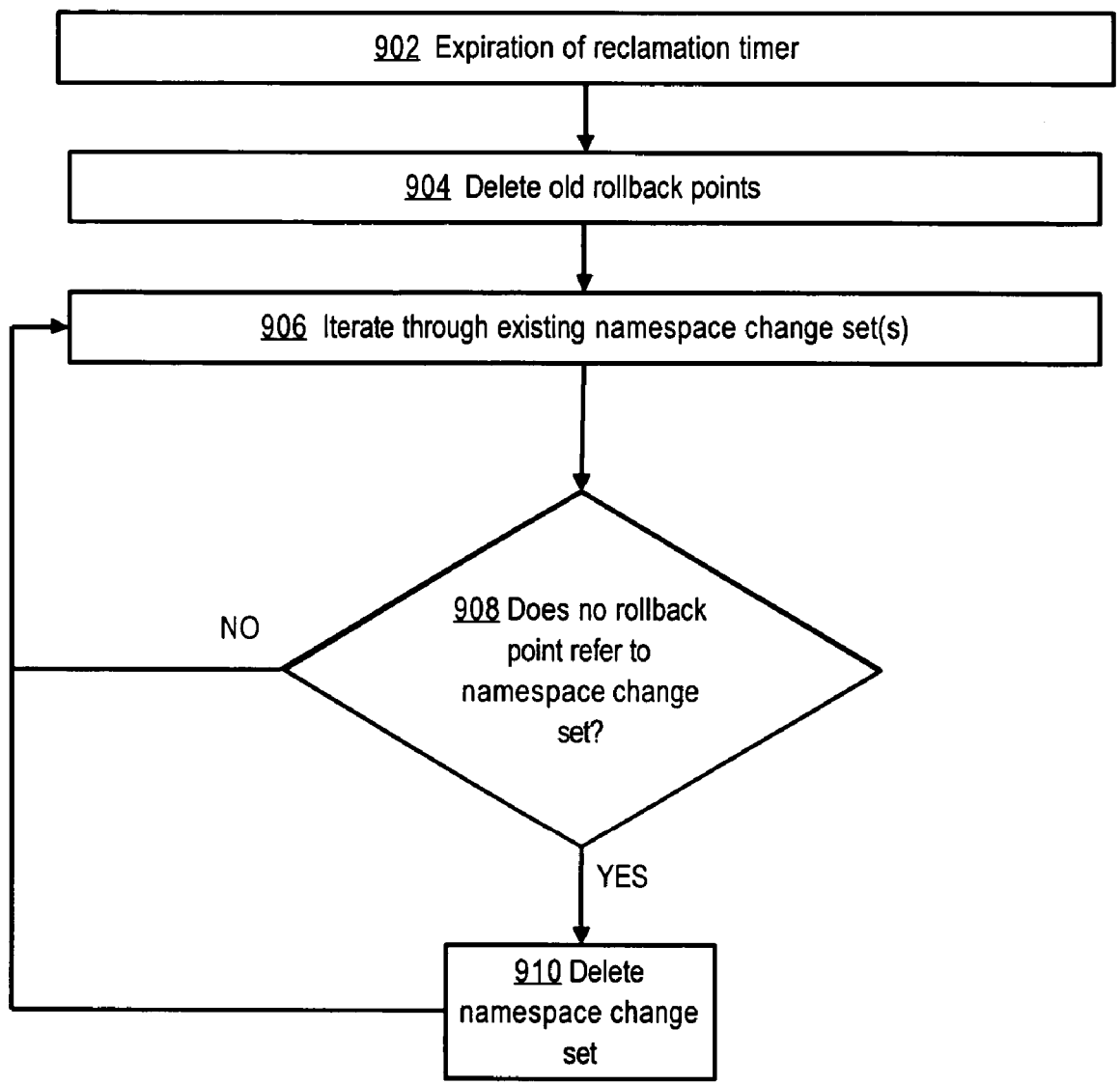
FIG. 9 is a flow diagram of periodically deleting namespace change sets.

FIG. 9 is a flow diagram of periodically deleting namespace change sets. In one embodiment, rollback points are periodically deleted to reclaim space in the persistent store. For example, in step 902, a reclamation timer expires. At step 904, old rollback points are deleted. In step 906, an iteration process is performed to review all existing namespace change sets. In step 908, a test is performed to determine whether no rollback point refers to the namespace change set that is currently under review. If so, then the namespace change set is deleted. Thus when the last rollback point referring to a namespace change set is deleted, the namespace change set is also deleted.

The configuration versioning and partitioning approaches herein allow configuration portions to be associated with a particular software component. Such software components can be dynamically removed and upgraded on a network device, and associated configuration is automatically removed. Further, during an in-service removal of a software component, associated configuration can be removed and saved for the user to view or reapply later. Such an action maintains configuration consistency. In addition, users can change the command syntax for a certain software component and modify the version of the associated configuration. If the associated configuration is detected to have an incompatible version during an in-service software upgrade, the associated configuration can be removed from the running configuration to be viewed and corrected by the user.

Implementing Mechanisms

Figure 3:
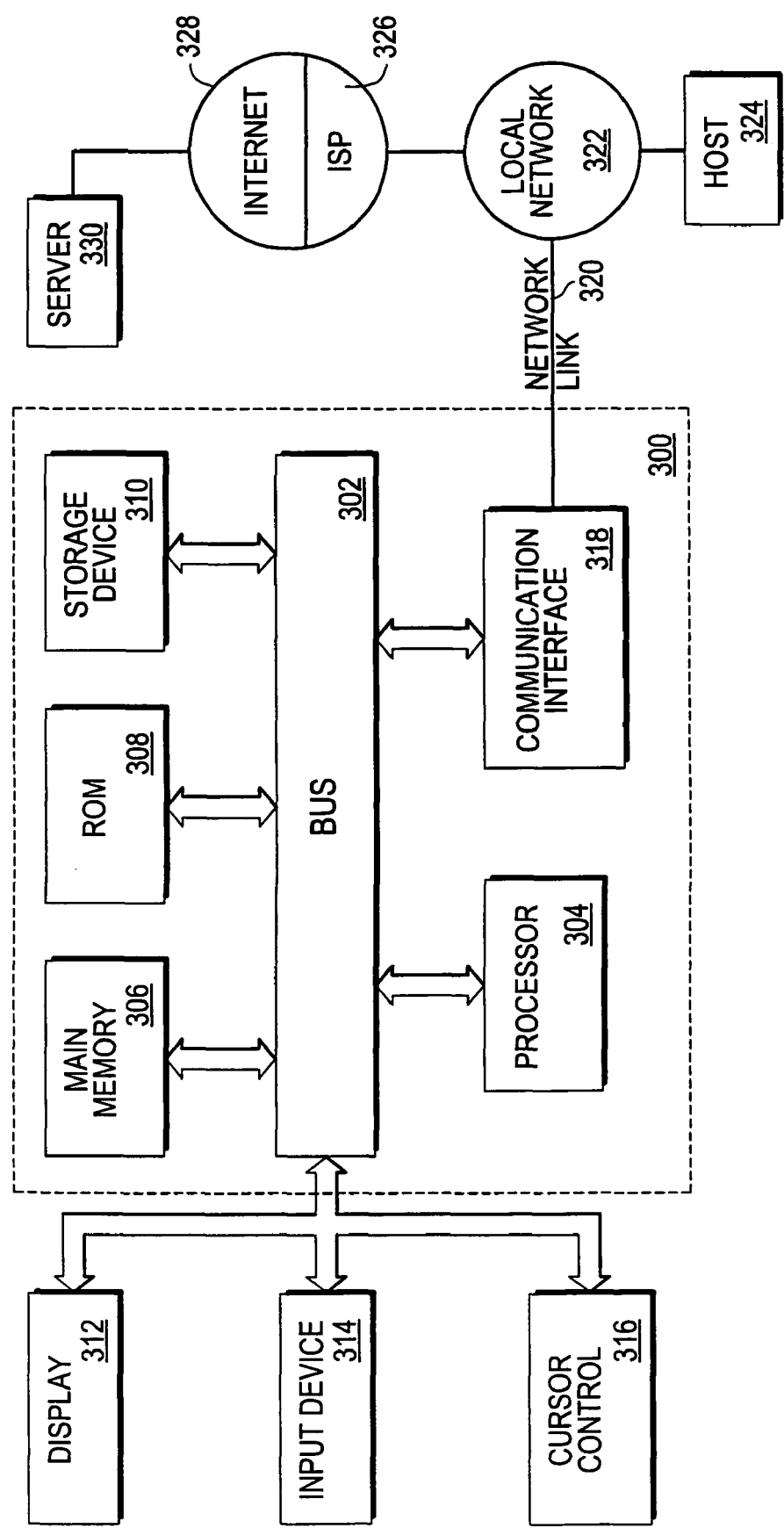
FIG. 3 is a block diagram that illustrates a computer system upon which an embodiment may be implemented.

In accordance with an embodiment, client 110 or network device 130 may be implemented on a computer system. FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed in a network device that comprises a plurality of software components that control operations and features of the network device, wherein operations and features of the network device are defined in part by a configuration, the method comprising:

in response to determining a configuration change in an operational state of the network device:

for all software components that make up an operating system for the network device:

the network device creating and storing one or more configuration partition namespaces each comprising a version identifier and one or more configuration tuples;

wherein the one or more configuration tuples describe the configuration change in the operational state of the network device;

the network device associating the one or more of the configuration partition namespaces to one or more configuration partitions;

the network device associating, to the one or more configuration partition namespaces, one or more of the software components to be executed to implement the configuration change of the network device; and the network device creating and storing information identifying the one or more of the software components, its associated configuration partition namespaces, and the version identifier of each of the configuration partition namespaces;

building the operating system for the network device using the information identifying the software components and the associated configuration partition namespaces, stored in the one or more configuration partitions;

loading an active set of configuration partition namespaces as part of a boot up of the operating system;

dynamically installing an additional software component that is not associated with the active set of configuration partition namespaces;

dynamically creating and storing a new configuration partition namespace corresponding to the further installed software component;

identifying the new configuration partition namespace in the active set of configuration partition namespaces.

2. A method as recited in claim 1, wherein associating one of the software components and the one or more configuration partition namespaces comprises creating a namespace component data structure that contains an association of one of the software components and the one or more configuration partition namespaces.

3. The method of claim 1, wherein the network device is a router comprising a distributed plurality of nodes, wherein nodes comprise route processors or line cards.

4. The method of claim 3, wherein a different configuration partition is associated with each of the nodes.

5. The method of claim 4, wherein a further configuration partition is associated with an administration plane of the network device.

6. The method of claim 1, wherein a different configuration partition is associated with each of a plurality of technology features of the network device that are implemented in the software components.

7. The method of claim 1, wherein a different configuration partition is associated with each of a plurality of logical interfaces of the network device.

8. The method of claim 1, wherein the version identifier comprises a major version number and a minor version number, the method further comprising:

receiving information defining a configuration commit representing a change in one or more of the configuration tuples;

determining whether the change comprises only adding one or more configuration tuples;

incrementing only the minor version number when the change comprises only adding one or more configuration tuples, and otherwise incrementing the major version number.

9. The method of claim 1, further comprising:

processing a command to uninstall a software component from the network device while the network device is running;

identifying one or more of the configuration partition namespaces that are associated with the software component to be uninstalled;

removing, from a system database that holds an active configuration, all configuration tuples associated with the identified configuration partition namespaces;

removing the identified configuration partition namespaces;

deactivating the software component.

10. The method of claim 1 or claim 9, further comprising:

storing information describing the installed software component and the uninstalled software component in a namespace change set;

storing the namespace change set in persistent storage.

11. The method of claim 10, further comprising:

receiving information defining a configuration commit;

storing, in persistent storage, metadata describing the configuration commit as part of a rollback point among a plurality of rollback points, wherein the rollback point includes a version number, wherein the version number is associated with an active partition and a software component;

receiving a request to roll back to an earlier version number;

selecting one of the rollback points that corresponds to the earlier version number;

determining whether software components associated with the selected one of the rollback points are compatible with other software components associated with an active namespace set.

12. The method of claim 11, further comprising:

periodically deleting old rollback points from the persistent storage;

determining whether a particular namespace change set is referenced by no rollback points, and if so, deleting the particular namespace change set.

13. A machine-readable volatile or non-volatile storage medium storing one or more sequences of instructions, wherein execution of the one or more sequences of instructions by one or more processors causes the one or more processors to perform in a network device that comprises a plurality of software components that control operations and features of the network device, wherein operations and features of the network device are defined in part by a configuration:

in response to determining a configuration change in an operational state of the network device:

for all software components that make up an operating system for the network device:

the network device creating and storing one or more configuration partition namespaces each comprising a version identifier and one or more configuration tuples;

wherein one or more configuration tuples describe the configuration change in the operational state of the network device;

the network device associating the one or more of the configuration partition namespaces to one or more configuration partitions;

the network device associating, to the one or more configuration partition namespaces, one or more of the software components to be executed to implement the configuration change of the network device; and the network device creating and storing information identifying the one or more of the software components, its associated configuration partition namespaces, and the version identifier of each of the configuration partition namespaces;

the network device building the operating system for the network device using the information identifying the software components and the associated configuration partition namespaces, stored in the one or more configuration partitions;

the network device loading an active set of configuration partition namespaces as part of a boot up of the operating system;

the network device dynamically installing an additional software component that is not associated with the active set of configuration partition namespaces;

the network device dynamically creating and storing a new configuration partition namespace corresponding to the further installed software component;

the network device identifying the new configuration partition namespace in the active set of configuration partition namespaces.

14. A machine-readable medium as recited in claim 13, wherein the network device is a router comprising a distributed plurality of nodes, wherein nodes comprise route processors or line cards, wherein a different configuration partition is associated with each of the nodes, and wherein a further configuration partition is associated with an administration plane of the network device.

15. A machine-readable medium as recited in claim 13, wherein a different configuration partition is associated with each of a plurality of technology features of the network device that are implemented in the software components.

16. A machine-readable medium as recited in claim 13, wherein the sequences of instructions further comprise instruction which, when executed by any of the processing nodes, cause any of the processing nodes to perform:
 processing a command to uninstall a software component from the network device while the network device is running;
 identifying one or more of the configuration partition namespaces that are associated with the software component to be uninstalled;
 removing, from a system database that holds an active configuration, all configuration tuples associated with the identified configuration partition namespaces;
 removing the identified configuration partition namespaces;
 deactivating the software component.

17. An apparatus comprising in a network device having a memory that comprises a plurality of software components that control operations and features of the network device, wherein operations and features of the network device are defined in part by a configuration:
 in response to determining a configuration change in an operational state of the network device:
  for all software components that make up an operating system for the network device:
   means for creating and storing one or more configuration partition namespaces each comprising a version identifier and one or more configuration tuples;
   wherein one or more configuration tuples describe the configuration change in the operational state of the network device;
   means for associating the one or more of the configuration partition namespaces to one or more configuration partitions;
   means for associating, to the one or more configuration partition namespaces, one or more of the software components to be executed to implement the configuration change of the network device; and
   means for creating and storing information identifying the one or more of the software components, its associated configuration partition namespaces, and the version identifier of each of the configuration partition namespaces;
   means for building the operating system for the network device using the information identifying the software components and the associated configuration partition namespaces, stored in the one or more configuration partitions;
   means for loading an active set of configuration partition namespaces as part of a boot up of the operating system;
   means for dynamically installing an additional software component that is not associated with the active set of configuration partition namespaces;
   means for dynamically creating and storing a new configuration partition namespace corresponding to the further installed software component;
   means for identifying the new configuration partition namespace in the active set of configuration partition namespaces.

18. An apparatus of claim 17, wherein the network device is a router comprising a distributed plurality of nodes, wherein nodes comprise route processors or line cards, wherein a different configuration partition is associated with each of the nodes, and wherein a further configuration partition is associated with an administration plane of the network device.

19. An apparatus of claim 17, wherein a different configuration partition is associated with each of a plurality of technology features of the network device that are implemented in the software components.

20. An apparatus of claim 17, further comprising:
 means for processing a command to uninstall a software component from the network device while the network device is running;
 means for identifying one or more of the configuration partition namespaces that are associated with the software component to be uninstalled;
 means for removing, from a system database that holds an active configuration, all configuration tuples associated with the identified configuration partition namespaces;
 means for removing the identified configuration partition namespaces;
 means for deactivating the software component.

21. An apparatus comprising a memory storing instructions which, when executed by one or more processors, cause the one or more processors to perform in a network device that comprises a plurality of software components that control operations and features of the network device, wherein operations and features of the network device are defined in part by a configuration:
 in response to determining a configuration change in an operational state of the network device:
  for all software components that make up an operating system for the network device:
   the network device creating and storing one or more configuration partition namespaces each comprising a version identifier and one or more configuration tuples;
   wherein one or more configuration tuples describe the configuration change in the operational state of the network device;
   the network device associating the one or more of the configuration partition namespaces to one or more configuration partitions;
   the network device associating, to the one or more configuration partition namespaces, one or more of the software components to be executed to implement the configuration change of the network device; and
   the network device creating and storing information identifying the one or more of the software components, its associated configuration partition namespaces, and the version identifier of each of the configuration partition namespaces;
   building the operating system for the network device using the information identifying the software components and the associated configuration partition namespaces, stored in the one or more configuration partitions;

loading an active set of configuration partition namespaces as part of a boot up of the operating system;

dynamically installing an additional software component that is not associated with the active set of configuration partition namespaces;

dynamically creating and storing a new configuration partition namespace corresponding to the further installed software component;

identifying the new configuration partition namespace in the active set of configuration partition namespaces.

22. An apparatus of claim 21, wherein the network device is a router comprising a distributed plurality of nodes, wherein nodes comprise route processors or line cards, wherein a different configuration partition is associated with each of the nodes, and wherein a further configuration partition is associated with an administration plane of the network device.

23. An apparatus of claim 21, wherein a different configuration partition is associated with each of a plurality of technology features of the network device that are implemented in the software components.

24. An apparatus of claim 21, further comprising:

means for processing a command to uninstall a software component from the network device while the network device is running;

means for identifying one or more of the configuration partition namespaces that are associated with the software component to be uninstalled;

means for removing, from a system database that holds an active configuration, all configuration tuples associated with the identified configuration partition namespaces;

means for removing the identified configuration partition namespaces;

means for deactivating the software component.

25. A packet router, comprising:

a plurality of distributed processing nodes connected over a network, wherein each of the nodes is controlled by one or more sequences of instructions, wherein execution of the one or more sequences of instructions by any of the processing nodes causes any of the processing nodes to perform the steps of:

in response to determining a configuration change in an operational state of the network device:

for all software components that make up an operating system for the network device:

the network device creating and storing one or more configuration partition namespaces each comprising a version identifier and one or more configuration tuples;

wherein one or more configuration tuples describe the configuration change in the operational state of the network device;

the network device associating the one or more of the configuration partition namespaces to one or more configuration partitions;

the network device associating, to the one or more configuration partition namespaces, one or more of the software components to be executed to implement the configuration change of the network device; and the network device creating and storing information identifying the one or more of the software components, its associated configuration partition namespaces, and the version identifier of each of the configuration partition namespaces;

building the operating system for the network device using the information identifying the software components and the associated configuration partition namespaces, stored in the one or more configuration partitions;

loading an active set of configuration partition namespaces as part of a boot up of the operating system;

dynamically installing of an additional software component that is not associated with the active set of configuration partition namespaces;

dynamically creating and storing a new configuration partition namespace corresponding to the further installed software component;

identifying the further configuration partition namespaces in the active set.

* * * * *